United States Patent [19]

Mourou et al.

[11] Patent Number: 4,517,675
[45] Date of Patent: May 14, 1985

[54] DYE LASER MEDIUM FOR SUBPICOSECOND LASER PULSE GENERATION

[75] Inventors: Gerard Mourou; Theodore Sizer, II, both of Rochester, N.Y.

[73] Assignee: The University of Rochester, Rochester, N.Y.

[21] Appl. No.: 332,647

[22] Filed: Dec. 21, 1981

[51] Int. Cl.$^3$ ............................................. H01S 3/20
[52] U.S. Cl. ........................................ 372/53; 372/5; 372/20
[58] Field of Search ........................... 822/53, 51, 11; 378/18–20, 5

[56] References Cited

PUBLICATIONS

Ishida; "Generation of Broadly Tunable Subpicosecond Light Pulses from a Synchronously and Passively Mode-Locked CW Dye Laser"; J. J. of App. Phys., vol. 19, No. 12, Dec. 1980; pp. L717-L720.
Shapiro et al.; "Ultrashort Light Pulses", Springer-Verlag. 1977, pp. 40–65.
Fork et al.; "Generation of Optical Pulses Shorter than 0.1 Picoseconds by Collidino Pulse Modelocking", Appl. Phys. Lett. 38 p. 671 (1981).
Sizer II et al.; "Generation and Amplification of Sub-Picosecond Pulses Using A Freg.-Doubled Ndi Yag Pumping Source"; Opt. Comm. 39, p. 259 (1981).
Nakatsuka et al.; "Recompression of Optical Pulses Broadened by Passage Through Optical Fibers"; Opt. Lett. 6, p. 13 (1981).

Primary Examiner—William L. Sikes
Assistant Examiner—Léon Scott, Jr.
Attorney, Agent, or Firm—Martin LuKacher

[57] ABSTRACT

Subpicosecond pulses less than 70 femtoseconds in duration are obtained with a synchronously pumped dye laser using a mixture of laser dye and a fast recovery saturable absorber which passes in a jet between folding mirrors in a laser cavity. The ratio of absorber to dye in the mixture is selected to compensate for dispersion effects in the laser medium which tend to limit the spectrum of the laser pulses and increase their duration.

4 Claims, 6 Drawing Figures

DYE LASER MEDIUM FOR SUBPICOSECOND LASER PULSE GENERATION

DESCRIPTION

The present invention relates to dye laser mediums and particularly to a dye laser medium for use in a dye laser to generate subpicosecond laser pulses.

Ultra short light pulses are much sought after in order to increase the resolution of many measurement processes and for synchronization purposes where timing is critical, as for example in inertial confinement fusion systems. The use of dye lasers to generate subpicosecond pulses has been suggested. Such dye lasers have been passively mode locked by means of saturable absorbers (See D. J. Bradley in *Ultra Short Light Pulses,* edited by S. L. Shapiro, *Topics in Applied Physics,* Vol. 18 (Springer-Verlag, N.Y., 1977) p. 18. The saturable absorber is located in a cell separate from the dye laser medium and is present principally to control the shape of the generated laser pulse. Pulses as short as 90 femtoseconds (fs) have been reported in a passively mode locked laser using a saturable absorber in which counterpropagating pulses interact (R. L. Fork, B. I. Green and C. B. Shank, Appl. Phys. Lett. 38, 671 (1981)). The use of a dye laser which is synchronously pumped by a frequency doubled mode locked laser has also resulted in stable, tunable subpicosecond pulses which can be amplified to relatively high power (See U.S. patent application Ser. No. 06/162,842 filed June 25, 1980 in the name of Gerard Mourou and T. Sizer, J. D. Kafka, A. Krisloff and G. Mourou, Optics Communications 39, 259 (1981)).

In the search for still shorter subpicosecond optical pulses, it has been discovered that such pulses can be produced through the use of a dye laser medium of which the laser dye and saturable absorber are constituent parts, and especially when such a dye laser is synchronously pumped and operated as a CW mode locked dye laser. A stable output of short pulses less than 70 fs in duration can be obtained. Such a synchronously pumped dye laser may be of the type described in the above identified Mourou Patent Application and Sizer, et al Optic Communications article. The laser medium is composed of a mixture of laser dye and a fast saturable absorber which may be in solution in a solvent. The ratio of saturable absorber to laser dye in the mixture is such that dispersion effects in the dye, which limits the band width and reduces the spectrum of the pulses, are compensated thereby permitting the generation of short, broad-band pulses.

It is a feature of this invention to provide an improved laser medium by means of which ultra short optical pulses can be generated.

Another feature of the invention is to provide an improved laser medium for use in synchronously pumped CW dye laser to generate ultra short optical pulses.

It is a still further object of the present invention to provide an improved laser medium for use in the generation of ultra short optical pulses by means of apparatus which has a minimum of critical components and adjustments and which provides a stable output through the efficient use of laser pump power.

The foregoing and other features, objects and advantages of the invention will become more apparent from a reading of the following description in connection with the accompanying drawings in which.

Figure 1:
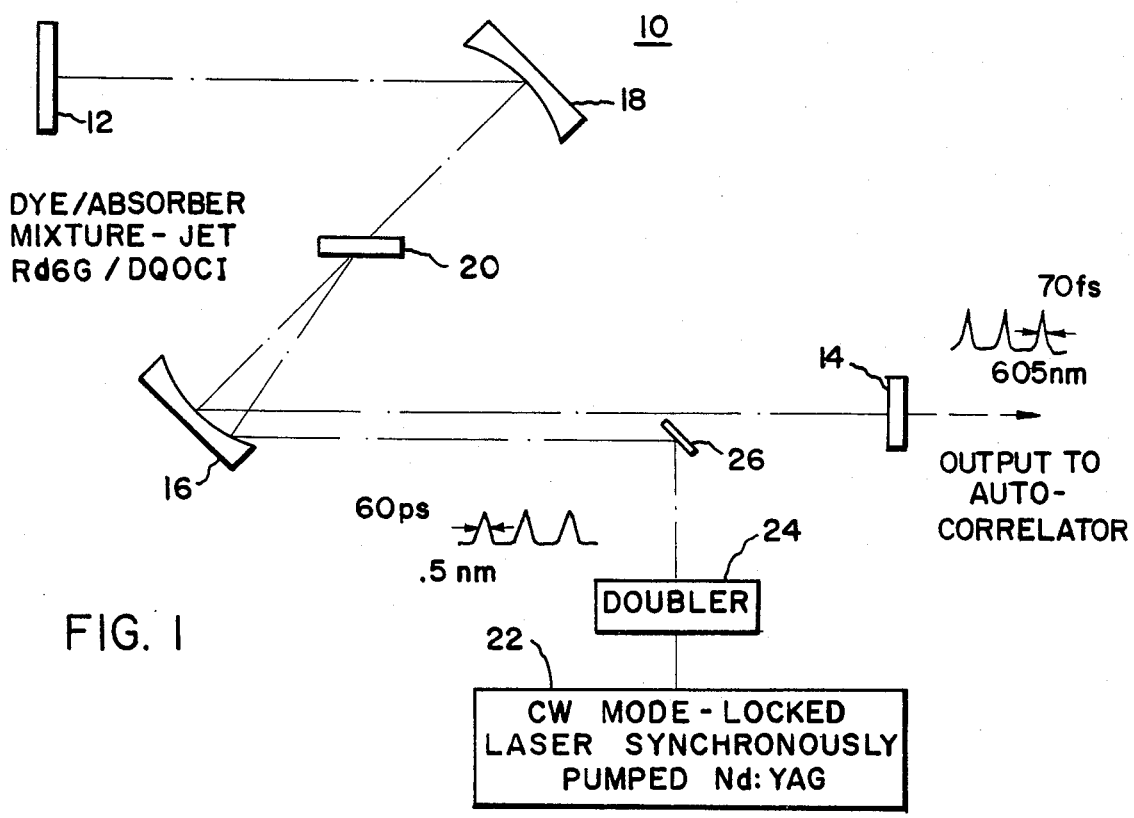
FIG. 1 is a schematic diagram illustrating a synchronously pumped CW dye laser for generating subpicosecond laser pulses using a laser medium in accordance with the invention.
Figure 2:
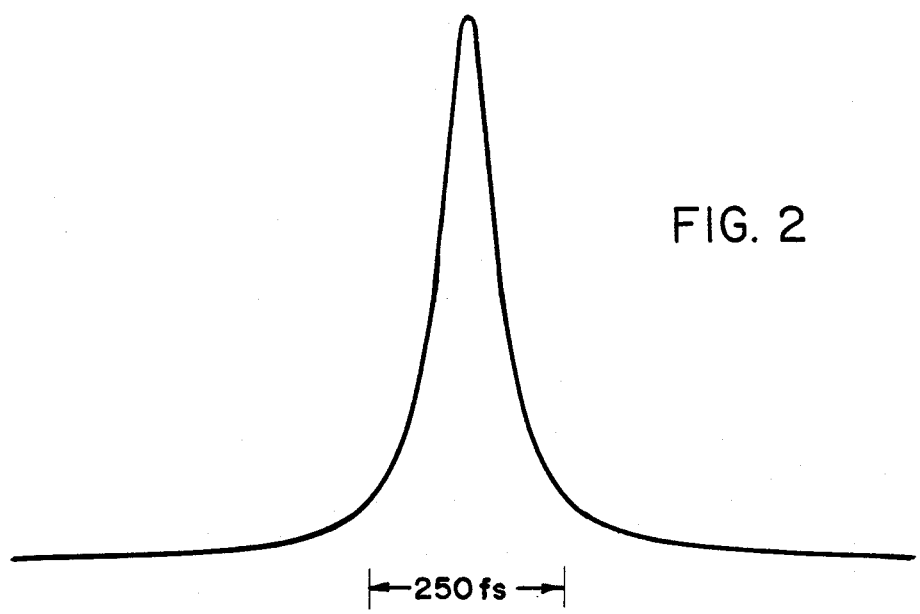
FIG. 2 is an enlarged view of the output of a background free autocorrelator which measures the output pulses from the system shown in FIG. 1.

Referring to FIG. 1, there is shown a synchronously pumped dye laser 10. The laser has four mirrors 12, 14, 16, and 18 which define a Z cavity configuration. At least one of the mirrors 12 and 14 (shown in the drawing as the mirror 14) is partially transmissive at the laser wave length and provides an output. This output is a train of subpicosecond optical, laser pulses which are synchronous with the pump. The width of these pulses may be measured using a background free autocorrelator. The output of such an autocorrelator for a single one of the output pulses is shown in FIG. 2. The absence of side lobes illustrates that the pulses are clean. The duration of the autocorrelation function as shown in FIG. 2 at the full width half maximum point shows that the pulses have a duration of less than 70 fs.

The mirrors 16 and 18 are curved folding mirrors. Suitably their focal length may be 5 cm. The laser medium is located between the curved mirrors 16 and 18. The medium is constrained in the form of a jet by means of a nozzle arrangement of the type conventionally used in dye lasers. A 200 micrometer thick jet disposed at the Brewster's angle to the optical path of the laser beam is presently preferred. The location of the jet is not critical.

The laser medium is a mixture of a laser dye and a fast saturable absorber. It is believed that laser dyes and absorbers of the type which have been used in passively mode locked dye lasers may also be used in the dye and absorber mixture in the jet 20. A list of such dye and absorbers may be found on pages 45 and 57 of the above cited article by D. J. Bradley. The selection of dye and absorber will depend upon the pump wavelength which is used.

In the presently preferred form of the invention the pump is a CW mode-locked laser, particularly the synchronously pumped Nd:YAG laser of the type described in the above referenced Mourou patent application and Sizer, et al article. This laser provides a train of short (e.g., 60 ps) pulses. The wavelength is halved (frequency is doubled) by a crystal doubler 24. Accordingly, the pump frequency is approximately 0.53 micrometers. The pump energy is reflected by a mirror 26 into the laser cavity where it is focused by the curved mirror 16 on the laser medium jet 20. The pump output power may be suitably 300 milliwatts average. The average output power of the output dye laser pulses is then approximately 30 milliwatts for an overall efficiency of 10 percent. At the pump frequency used the dye laser operates at 605 nano meters, which of course is at the center of the spectrum of the pulses. A thin (e.g.2 micrometer) uncoated pellice may be used to tune the dye laser output wave length without restricting the band width. Preferably the cavity length of the Nd:YAG laser is equal to the dye laser cavity length, as measured between the mirrors 12 and 14. To minimize cavity length fluctuation, both the pump laser 22 and the dye laser 10 may have their cavity defining mirrors set on low expansion metal slabs (e.g., super-invar slabs).

The laser medium which provides the jet is preferably, when a doubled Nd:YAG laser output is used as the pump, a mixture of Rhodamine 6G laser dye and DQOCI fast saturable absorber in a molar ratio of approximately 20 to 1. DQOCI is the abbreviation for a dye known as 1, 3 prime-diethyl-4,2 primequinolyoxacarbocyanide iodide. Specifically, the dye laser is a mixture of $5 \times 10^4$M Rhodamine 6G and $3 \times 10^5$M DQOCI. Since the ratio is expressed in molar terms it will be apparent that the molecular ratio of Rhodamine 6G to DQOCI in the mixture is about 50 to 3. This ratio is important in that it is believed to provide for compensation of dispersion in the laser mixture. Dispersion is due to the rate of change of refractive index, n, as a function of wavelength in the laser medium. There is an interplay between the normal and anomalous dispersion in the solvent, Rhodamine 6G and the DQOCI mixture. The mixture may be considered, of course, a solution of the laser dye and absorber in the solvent. The solvent in the presently preferred mixture is ethylene glycol.

Figure 3A:
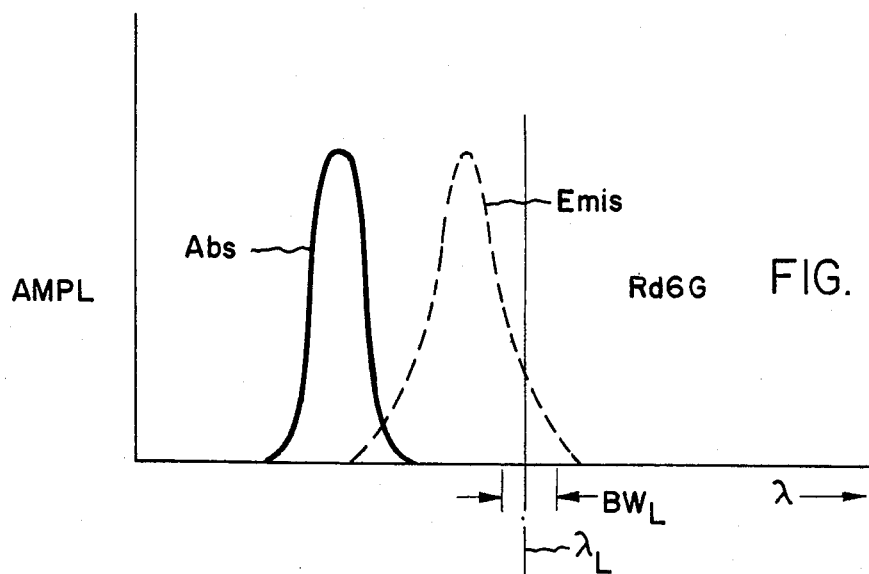
FIG. 3 is a series of curves from which may be obtained an understanding of the physical mechanism involved in the generation of ultra short optical pulses through the use of a laser medium embodying the invention.
Figure 3B:
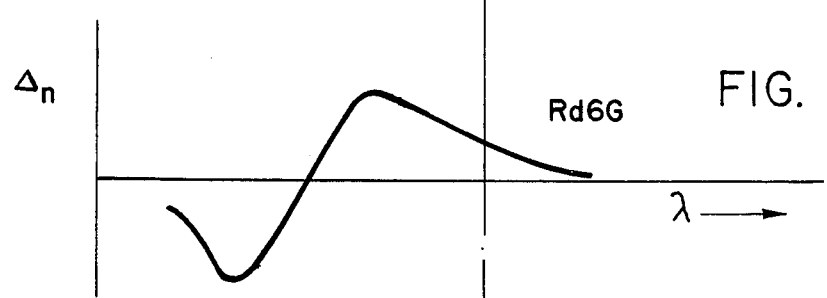
Figure 3C:
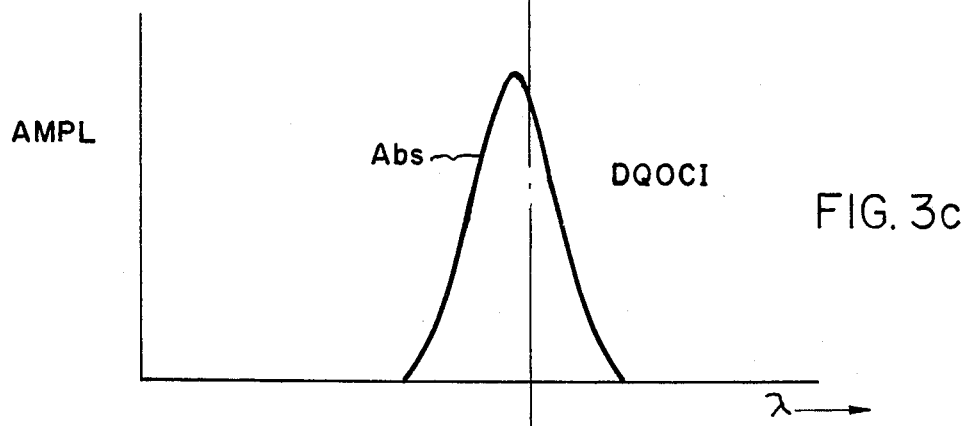
Figure 3D:
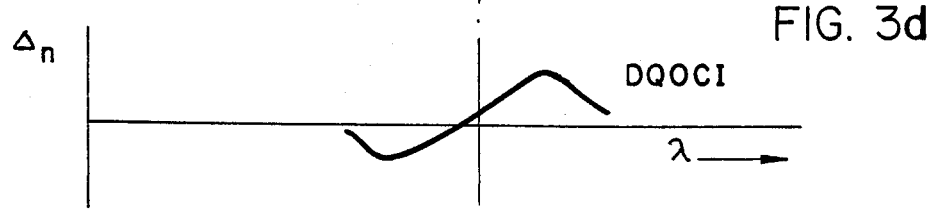

It will be observed from the curves of the absorption and emission characteristics of Rhodamine 6G (Rd 6G) and DQOCI as shown in FIGS. 3a and 3b that the absorption band of the DQOCI matches and overlaps the emission band of the Rhodamine 6G. The laser wave length $\lambda_L$ and the lasing band width $BW_L$ covers a portion of the emission band of the Rhodamine 6G and the absorption band of the DQOCI. The change of refractive index which is believed to be a principal factor in the dispersion which limits the band width is shown in FIGS. 3b and 3d for Rhodamine 6G and DQOCI respectively. The molecular ratio of the dye and the absorber are determinative of the amplitude of the index change over the lasing band width, $BW_L$. The characteristics of the absorber and the dye are such that their rate of change of index are in opposite senses. Accordingly, the selection of the molecular ratio and the absorber serves to compensate for the index change in the laser dye and therefore minimizes the dispersion in the laser mixture. The net effect of placing the dye and absorber in a mixture and using that mixture as the dye laser medium is to produce extremely short pulses when the laser is pumped by a short pulse CW mode-locked laser. Other factors which are not fully understood may also contribute to the ultra short pulse operation of the laser using the absorber laser dye mixture. Accordingly, the invention should not be taken as limited to any theory of operation. The probability that the mechanism by which ultra short output pulses is maintained involves compensation for dispersion is indicated by the use of metal vapors to recompress pulses which have passed through optical fibers (See H. Nakatsuka and D. L. Grischkowsky, Optics Letters, 6, 13 (1981).

From the foregoing description it will be apparent that there has been provided an improved laser medium which used in a dye laser provides the shortest output optical laser pulses yet reported. Variations and modifications of the herein described laser medium and system, within the scope of the invention, will undoubtedly suggest themselves to those skilled in the art. Accordingly, the foregoing description should be taken as illustrative and not in a limiting sense.

We claim:

1. For use in a synchronously pumped CW dye laser to generate pulses of subpicosecond duration, a laser medium consisting essentially of a mixture of laser dye and saturable absorber where the molecular ratio of absorber to dye is 3 to 50 to compensate for dispersion in said laser medium, and said laser dye being Rhodamine 6G and said absorber is 1,3 prime-diethyl-4,2 prime-quinolyoxacarbocyanide iodide, which is known as DQOCI, or wherein said mixture consists essentially of $5 \times 10^4$M of Rhodamaine 6G and $3 \times 10^{-5}$ of said DQOCI.

2. The invention as set forth in claim 1 wherein said mixture is a solution of Rhodamine 6G and said DQOCI in ethylene glycol solvent.

3. A dye laser medium consisting essentially of a mixture of laser dye and saturable absorber where the molecular ratio of absorber to dye is 3 to 50 molar to compensate for dispersion in said medium, and said laser dye being Rhodamine 6G and said absorber being 1,3 prime-diethyl-4,2 prime-quinolyoxacarbocyanide iodide which is known as DQOCI, or wherein said mixture consists essentially of $5 \times 10^{-4}$M of Rhodamaine 6G and $3 \times 10^{-5}$M of said DQOCI.

4. The invention as set forth in claim 3 wherein said mixture is a solution of Rhodamine 6G and said DQOCI in ethylene glycol solvent.

* * * * *